United States Patent [19]

Oakley et al.

[11] Patent Number: 4,662,510

[45] Date of Patent: May 5, 1987

[54] BELT CONVEYOR APPARATUS

[75] Inventors: David J. Oakley, Richland; Rex L. Bogart, Kennewick, both of Wash.

[73] Assignee: The United States of America as represented by the United States Department of Energy, Washington, D.C.

[21] Appl. No.: 541,805

[22] Filed: Oct. 13, 1983

[51] Int. Cl.[4] ............................................. B65G 15/08
[52] U.S. Cl. ..................................... 198/819; 198/820
[58] Field of Search ......................... 198/819, 820, 821

[56] References Cited

U.S. PATENT DOCUMENTS

| | | | |
|---|---|---|---|
| 2,199,935 | 5/1940 | Johns | 198/819 |
| 2,365,762 | 12/1944 | Johns et al. | 198/819 |
| 3,101,835 | 8/1963 | Wildbolz | 198/819 |
| 3,144,929 | 8/1964 | Carpenter | 198/820 X |
| 3,308,544 | 3/1967 | White | 198/819 |
| 3,332,537 | 7/1967 | Davidson | 198/819 |
| 3,978,976 | 9/1976 | Kamp | 198/819 |
| 4,000,809 | 1/1977 | Lenntoft | 198/819 |
| 4,030,728 | 6/1977 | Wallace et al. | 198/819 |

FOREIGN PATENT DOCUMENTS

| | | | |
|---|---|---|---|
| 2263955 | 3/1974 | France | 198/819 |
| 2276246 | 1/1976 | France | 198/819 |
| 42531 | 1/1938 | Netherlands | 198/819 |
| 175874 | 6/1961 | Sweden | 198/819 |
| 444549 | 3/1936 | United Kingdom | 198/819 |
| 473117 | 10/1937 | United Kingdom | 198/819 |

OTHER PUBLICATIONS

Xerox Disclosure Journal, vol. 1, No. 6, Jun. 1976, pp. 43-44.

Primary Examiner—Joseph E. Valenza
Assistant Examiner—Jonathan D. Holmes
Attorney, Agent, or Firm—Thomas R. Trempus

[57] ABSTRACT

A belt conveyor apparatus according to this invention defines a conveyance path including a first pulley and at least a second pulley. An endless belt member is adapted for continuous travel about the pulleys and comprises a lower portion which engages the pulleys and an integral upper portion adapted to receive objects therein at a first location on said conveyance path and transport the objects to a second location for discharge. The upper belt portion includes an opposed pair of longitudinally disposed crest-like members, biased towards each other in a substantially abutting relationship. The crest-like members define therebetween a continuous, normally biased closed, channel along the upper belt portion. Means are disposed at the first and second locations and operatively associated with the belt member for urging the normally biased together crest-like members apart in order to provide access to the continuous channel whereby objects can be received into, or discharged from the channel. Motors are in communication with the conveyance path for effecting the travel of the endless belt member about the conveyance path. The conveyance path can be configured to include travel through two or more elevations and one or more directional changes in order to convey objects above, below and/or around existing structures.

11 Claims, 8 Drawing Figures

BELT CONVEYOR APPARATUS

BACKGROUND OF THE INVENTION

The invention relates to belt conveyors, particularly belt conveyors adapted to receive and positively engage an object to be transferred thereon.

It has been a continuing objective in the art of belt conveyors to provide a system for transferring material from a first location to a second location with minimal danger of the material spilling or falling from the belt. One such proposed solution utilizes opposed belts which hold the materials between adjacent surfaces. This technique requires a substantial structural framework and causes significant problems in belt wear.

Another technique is taught in U.S. Pat. No. 3,332,537 which provides an endless conveyor belt consisting of a tubular member formed with a longitudinally extending slit that permits the tubular member to be spread from a closed to an open condition. The tubular member is formed from resilient material and remains in a substantially closed position. The tube is supported between a pair of laterally spaced endless drive V-belts such that the lateral movement of the belts from one another opens the slit, and movement of the V-belts towards one another permits the resilience of the tubular material to close the slit.

U.S. Pat. No. 4,000,809 discloses a tubular endless belt with lateral V-beltlike beads to be engaged by drive and idler pulleys. The tubular belt has cliplike springs to load the longitudinal edges of the belt into an abutting relationship. Pressure rollers along the conveyor belt separate the belt against the bias of the clip springs to load and unload the belt. Alternatively, the tubular belt can be opened by pulling the V-belts apart through the use of laterally distanced idler pulleys.

It is an object of this invention to provide a belt conveyor apparatus for the transfer of, for example, a steady stream of objects from one location to another without dropping or releasing the object.

It is also an object of this invention to provide a belt conveyor system which transfers objects from a first elevation through a second elevation to a third elevation without dropping or releasing the objects.

SUMMARY OF THE INVENTION

A belt conveyor apparatus according to this invention comprises means which define a conveyance path including a first pulley and at least a second pulley. An endless belt member is adapted for continuous travel about the pulleys and comprises a lower portion which engages the pulleys and an integral upper portion adapted to receive objects therein at a first location on said conveyance path and transport the objects to a second location for discharge. The upper belt portion includes an opposed pair of longitudinally disposed crest-like members, biased towards each other in a substantially abutting relationship. The crest-like members define therebetween a continuous, normally biased closed, channel along the upper belt portion. Means are disposed at the first and second locations and operatively associated with the belt member for urging the normally biased together crest-like members apart in order to provide access to the continuous channel whereby objects can be received into, or discharged from the channel. Motive means are in communication with the means defining the conveyance path for effecting the travel of the endless belt member about the conveyance path.

The conveyance path can be configured to include travel through two or more elevations and one or more directional changes in order to convey objects above, below and/or around existing structures.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE INVENTION

Figure 1:
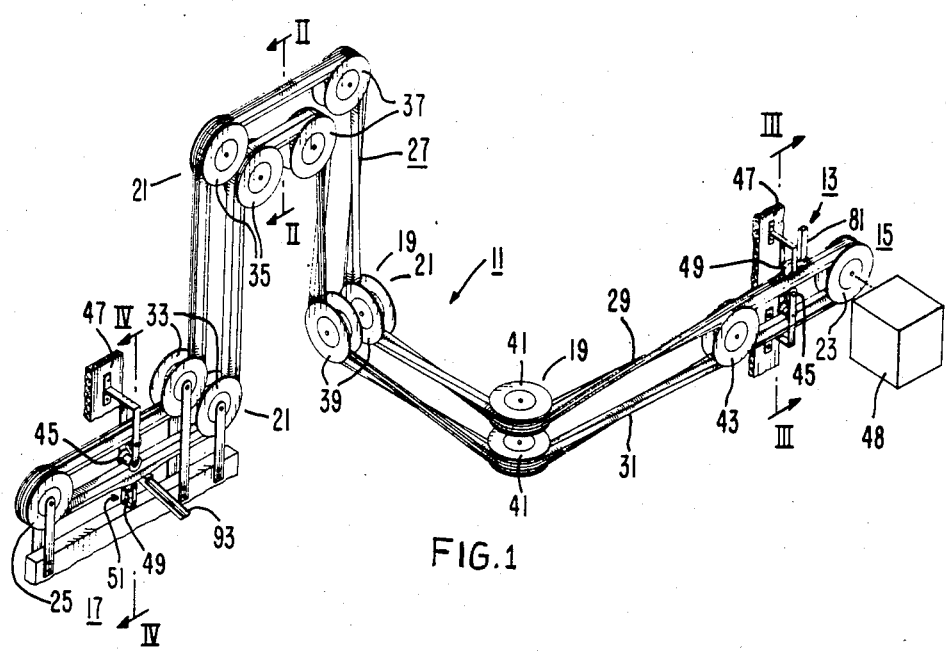
FIG. 1 is a somewhat schematical illustration of a belt conveyor apparatus according to this invention in which the conveyance path travels through several elevational and directional changes.

The invention is a conveyor belt and belt conveyor apparatus for the transfer of objects from a first location to a second location. The apparatus of this invention is particularly well suited for the transfer of objects such as reactor fuel pellets, electric components and other objects and materials of similar size. Considering FIG. 1, a first embodiment of a belt conveyor apparatus according to this invention is somewhat schematically illustrated and generally indicated by the reference character 11. The belt conveyor 11 includes means defining a conveyance path 13 traversing a region between a first location 15 and a second location 17. The traversed region can include one or more directional changes as at 19 and one or more elevational changes as at 21. The capacity of the present invention to provide material conveyance along a somewhat convoluted path as well as a more conventional straight line path facilitates installation and use of the invention in a variety of existing commercial environments. The conveyance path 13 includes a first pulley 23 and at least a second pulley 25 about which an endless belt member 27 is adapted for continuous travel and defining thereby an upper reach 29 and a lower reach 31. Generally, an object will be conveyed from the first to the second locations along the upper reach 29, while the now empty endless belt returns to the first location 15 from the second location along the lower reach 31. Several additional pulleys as at 33, 35, 37, 39, 41 and 43 and a plurality of idlers as at 45 are provided along a structural framework 47 to define the contour of the conveyance path. Motive means, schematically represented at 48 is in communication with the conveyance system for effecting the travel of the endless belt about the conveyance path defined by the several pulleys and idlers. Such motive means 48 are well known in the art of endless belt conveyors and therefore not illustrated in detail herein.

A means 49 for loading the belt conveyor 11 is operably associated with the endless belt 27 at the first location 15 and a means 51 for unloading the belt conveyor 11 is operably associated with the endless belt 27 at the second location 17. Both the loading and unloading means will be described in detail in connection with FIGS. 3 and 4.

Figure 2:
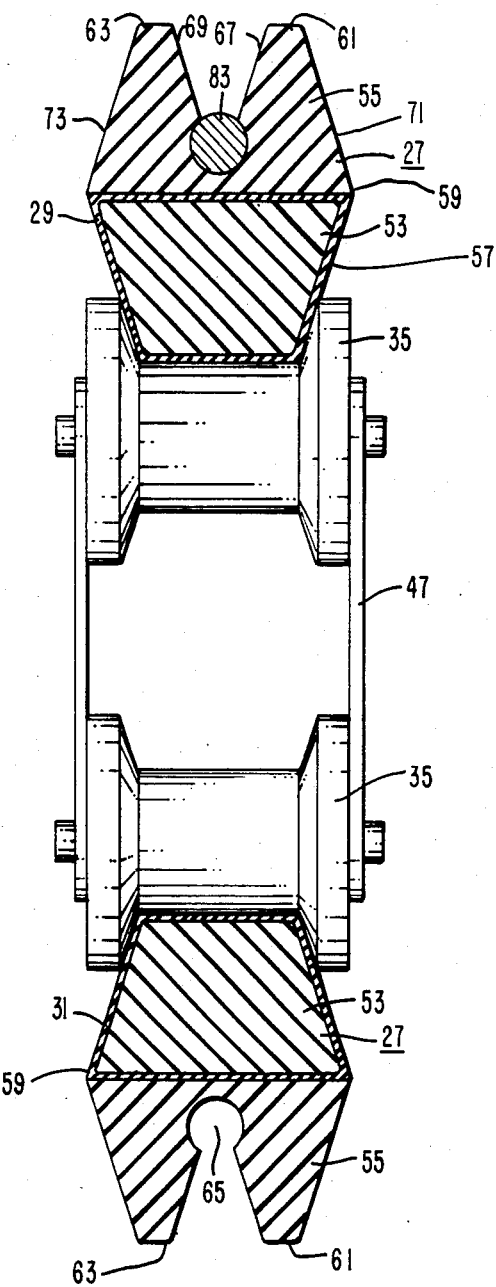
FIG. 2 is a section through the belt conveyor apparatus belt along lines II—II of FIG. 1.

Turning to FIG. 2, a cross section of the endless belt 27 along lines II—II of FIG. 1 illustrates both the structure of the preferred embodiment of the endless belt and the technique by which an object is retained therein during transport between locations along the conveyance path. The endless belt 27 includes a lower portion 53 and an upper portion 55. In the preferred embodiment, the lower portion 53 has a V-beltlike cross section adapted for continuous travel about the various pulleys and idlers of the conveyor structure and can include reinforcing cord 57 throughout. The upper portion 53 is made integral with the lower V-beltlike portion through an appropriate manufacturing technique, i.e., the upper and lower belt portions can be independently manufactured and vulcanized as at 59 to form the integral, endless belt 27. The upper portion 55 includes an opposed pair of longitudinally disposed crest-like members 61 and 63 defining therebetween a continuous channel 65. The crest-like members 61 and 63 have opposed inner surfaces 67 and 69 which taper from the top of each crest-like member toward the channel 65 and cooperate with the loading and unloading means as will be hereinafter explained. Outer surfaces 71 and 72 extend from the top of the crest-like member to the lower portion of the belt 27.

The continuous channel 65 is generally circular in cross section and of a dimension adapted to be approximately the same as, or preferably slightly smaller than the object or material to be conveyed therein. Thus, when an object is deposited into the belt channel 65, the opposed crest-like members 61 and 63 tend to close the circular channel about the object and often slightly distort the channel, thus positively engaging the object therein. By positively engaging, it is to be understood that a combination of several factors, such as the resiliency, rigidity and channel size, serve to provide the forces necessary to retain the object in the belt channel without generating potentially damaging stress forces against the object and without unduly distorting the conveyor belt profile during travel along the conveyance path.

Figure 3:
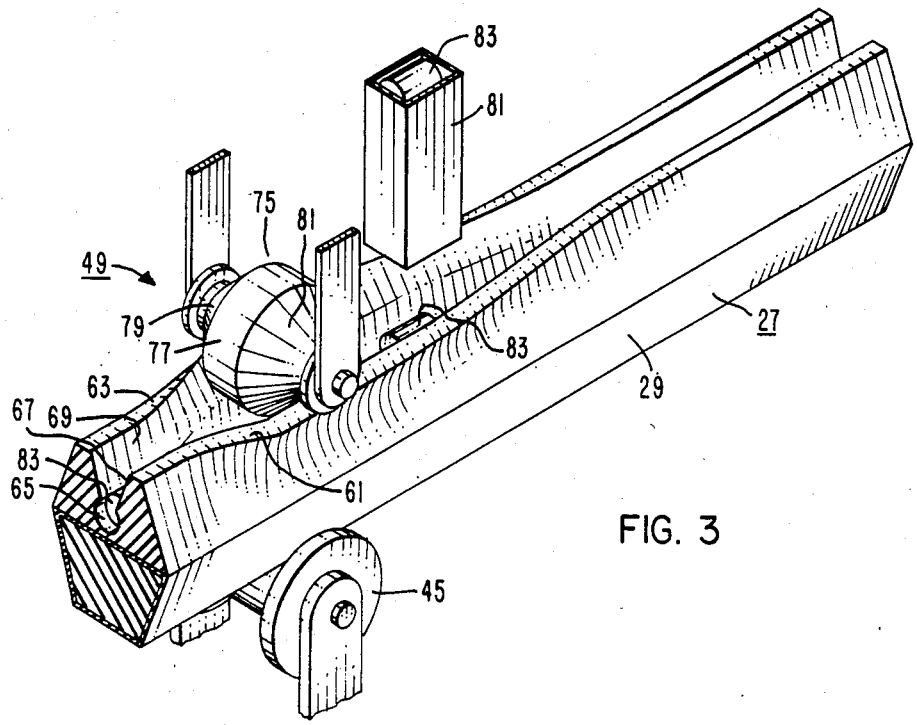
FIG. 3 is a section through the belt conveyor apparatus along lines III—III of FIG. 1 illustrating the loading of the belt.

Considering both FIGS. 2 and 3, the technique by which the endless belt member 27 is loaded with an object at the first location can be readily appreciated. The means 49 for loading the belt conveyor is operably associated with the endless belt and includes a pulley 75 having a crown 77 and a pair of cones 79 and 81. The pulley 75 is typically a free wheeling pulley disposed above the endless belt 27 such that the cones 79 and 81 continuously engage the inner surfaces 67 and 69 of the upper belt portion crests. This relationship separates the crests 61 and 63 of the upper belt portion, causing the channel 65 to be forced into an open condition for the deposit of an object thereinto. A loading tube 81 or similar device is disposed near the crown 77 portion of the pulley in order to deposit the object 83 into the channel 65 while it is spread open. While a single pulley 75 is provided in the illustrated loading system, it is to be understood that the loading system contemplated for use with the present belt conveyor system utilizes at least one such pulley 75. For example, the loading means can incorporate two such pulleys 75 longitudinally displaced along the conveyance path in order to provide an extended open channel area for the deposit of objects thereinto. In such a configuration, a loading tube 81 or some functionally similar device could be disposed between the two pulleys 75 to effect object placement into the open channel. It is also preferred that an idler 45 be disposed below the endless belt member 27 proximate each pulley 75 in order to provide support to the belt as it is being spread open by the pulley 75.

Figure 4:
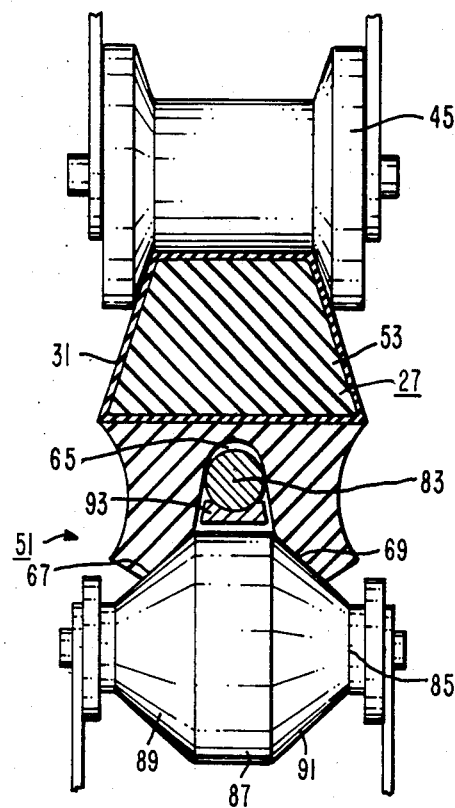
FIG. 4 is a section through the belt conveyor apparatus along lines IV—IV of FIG. 1 illustrating the unloading of the belt.

The means for unloading 51, the endless belt conveyor of this invention, is illustrated in FIG. 4 with reference to FIG. 1. The endless belt member 27 can be effectively unloaded at the second location on either the upper or lower reach of the conveyance path. Unloading along the upper reach would typically require the use of a pick-and-place industrial manipulator, a vacuum device or a magnetic device, depending upon the nature of the conveyed object. When the unloading means is disposed along the lower reach as illustrated herein, a gravity feed discharge chute 93 can be disposed to receive the object as it freely falls from the open channel 65. In any event, the means 51 for unloading the endless belt member 27 consists of at least one pulley 85 having a crown 87 and a pair of cones 89 and 91. The pulley 87 is typically a free wheeling pulley disposed below the endless belt 27 such that the cones 79 and 81 continuously engage the inner surfaces 67 and 69 of the upper belt portion crests. This relationship urges the crests 61 and 63 apart and causes the channel 65 to be forced into an open condition thereby releasing the object 83. When a single unloading pulley 85 is employed, the discharge chute 93 is disposed proximate the crown 87 of the pulley 85 in order to receive the object 83 upon opening of the channel 65. When two unloading pulleys 85 are employed, the means for receiving the object discharged from the belt can be disposed accordingly between the pulleys 85. Again, it is also preferred that an idler 45 be disposed in contact with the lower portion 53 of the endless belt member 27 proximate each pulley 85 in order to provide support to the belt 27 as it is being spread apart by the pulley 85.

For the reasons described above, the object being conveyed is positively retained within the belt channel 65 during conveyance from the first to the second location. As a result of the positive retention of the object, the conveyance path can be manipulated to travel through more than one elevation and one or more directional changes as shown in FIG. 1. It is to be appreciated that the acuteness of any elevational or directional change must be regulated with respect to the type of object being conveyed. For example, an object of minimal longitudinal dimension disposed in the conveyor belt channel 65 would typically withstand without damage or undesired stress, a more acute directional or elevational change than an object of a somewhat greater longitudinal dimension.

Figure 5A:
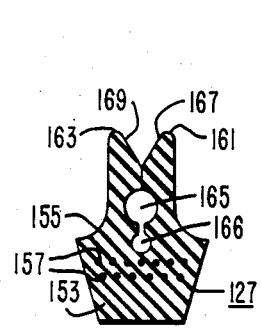
FIGS. 5A, 5B, and 5C illustrate alternative configurations of the belt conveyor apparatus belt, all according to the present invention.
Figure 5B:
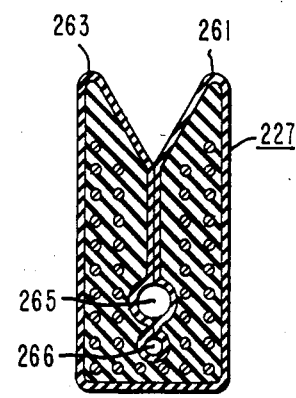
Figure 5C:
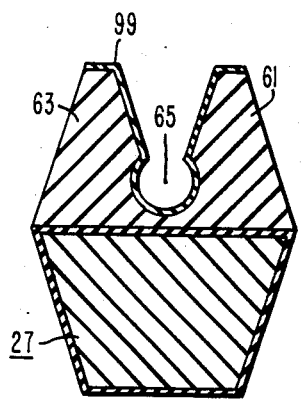

While the endless belt member 27 shown in FIGS. 1 through 4 represents the preferred belt cross-sectional configuration, alternative configurations are, of course, possible and examples thereof illustrated in FIGS. 5A, 5B, and 5C. The alternative configuration of the endless belt member 127 of FIG. 5A includes a channel 165 disposed between and defined by a pair of crest-like members 161 and 163 which are of minimal thickness for ease in the manipulation thereof. Each crest-like member has an inner surface 167, 169 which cooperates with the means for loading and unloading objects into the channel 165. An additional feature which is shown in the alternative embodiment and which can be readily incorporated into the previously described embodiment is a secondary channel 166 centrally disposed below the conveyance channel 165. The secondary channel 166 facilitates the opening of the channel 165 during loading and unloading operations by minimizing any stress induced in the lower belt portion 153 by movement of the upper belt portion 155. A plurality of reinforcing cords 157 can also be provided.

A somewhat modified embodiment of an endless belt member 227 is illustrated in FIG. 5B and includes crest-like members 261 and 263 which define a conveyance channel 265 therebetween. A secondary channel 266 can also be included. This alternative embodiment is characterized by a cross section of a substantially continuous dimension which can provide an enhanced level of upper belt rigidity for positively retaining an object within the channel 265.

FIG. 5C illustrates an additional feature which can be incorporated into any of the several belt configurations described and illustrated herein, accordingly, the cross-section of the preferred embodiment of the endless conveyor belt 27 is provided as an exemplar only. The continuous channel 65 and at least a portion of the crest-like members 61 and 63 are lined with a separate material 99 which is bonded to the upper belt portion. The liner is preferably a silicone rubber or urethane bonded to the base belt.

Figure 6:
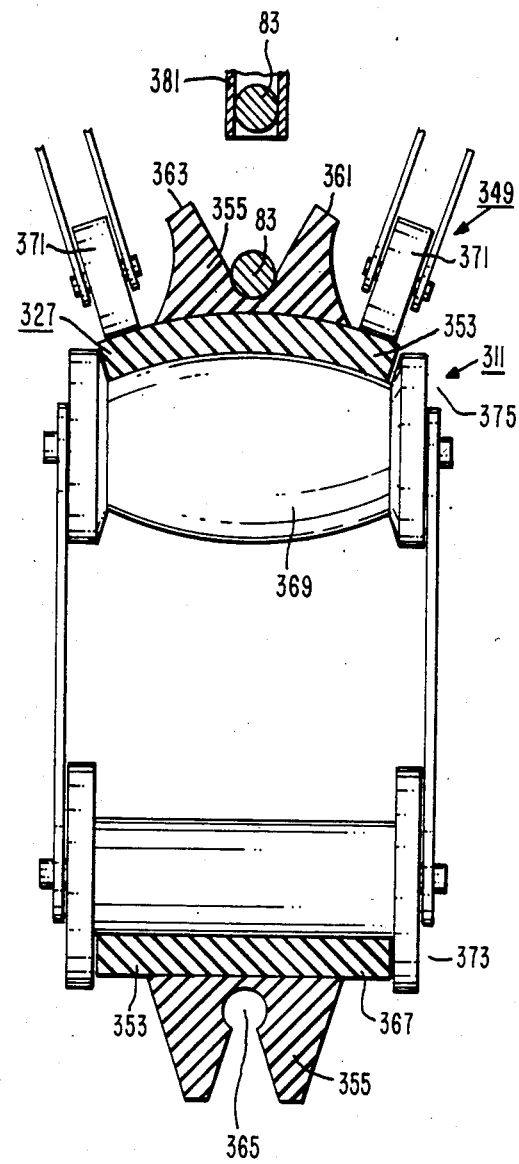
FIG. 6 is a section through a belt conveyor illustrating an alternative embodiment of the belt conveyor apparatus according to this invention.

Turning to FIG. 6, a section through an endless belt conveyor apparatus illustrating an alternative embodiment thereof, is generally indicated by the reference character 311. The alternative embodiment provides a conveyance path that is completely compatable with the conveyance path illustrated in FIG. 1, that is, the alternative belt conveyor apparatus configuration can include one or more directional changes and one or more elevational changes. The distinguishing characteristics of the alternative embodiment 311 reside in the lower belt 353 and the manner in which the means 347 operatively associated with the endless belt member to urge the crest-like portions 361 and 363 cooperates with the endless belt member 327. The endless belt member includes a lower portion 353 and an upper portion 355. The upper portion 355 is integral with the lower portion and has an opposed pair of longitudinally disposed crest-like members 361 and 363 defining therebetween a continuous channel 365. The continuous channel 365 is generally circular in cross section and of a dimension adapted to be approximately the same as, or preferably slightly smaller than the object or material to be conveyed therein. The lower portion 353 is a flexible generally flat member having a width that is greater than the integral upper portion 355. The lower belt portion 353 extends laterally as at 367, relative to said upper portion from each side thereof. The disposition of the laterally extending portions 367 of the endless belt member controls the loading and unloading of materials into the continuous channel 365.

While FIG. 6 only illustrates a means 349 for loading the alternative embodiment of the endless belt conveyor apparatus 311, the theory of this embodiment is readily transferable to a means for unloading the belt conveyor and can be appreciated by inverting the figure. The loading means 349 includes at least one crowned pulley 369 upon which the flexible lower portion 353 of the endless belt travels and at least one idler 371 disposed on either side of the endless belt member and so oriented as to cause the lower belt portion to conform to the shape of the crown pulley 369. When so urged against the crown pulley 369, the lower portion of the belt is transformed from the first generally planar disposition (as at 373) into the second generally concave disposition, (as at 375). The concave disposition of the lower portion of the belt member causes the normally inwardly biased crest-like members 361 and 363 to be urged apart, (as indicated by the arrows) thus providing access to the continuous channel 365. Means such as at 381 can also be provided to deposit material such as pellet 83 into or to retrieve material out from the continuous at a first and second location along the conveyance path as illustrated in conjunction with the aforedescribed first embodiment as in FIG. 1.

What has been described is an endless belt conveyor for use in a conveyance system which travels through one or more directional changes and one or more elevational changes. The conveyance system includes means for loading and unloading the conveyor belt, which means cooperate with the belt to provide access to a longitudinally disposed channel.

What is claimed is:

1. A belt conveyor apparatus comprising:

means defining a conveyance path including a first pulley and at least a second pulley, an endless belt member adapted for continuous travel about said pulleys defining thereby an upper and lower reach, said endless belt member having a lower portion which engages said pulleys and an integral upper portion adapted to receive objects at a first location on said conveyance path and transport said objects to and then discharge said objects at a second location on said conveyance path, said upper belt portion including an opposed pair of longitudinally disposed crest-like members, normally biased toward each other and defining therebetween a continuous, normally biased closed, channel along said upper belt portion, said crest-like members having opposed inner surfaces which taper from the top of each crest-like member toward said channel wherein said objects are positively engaged and retained entirely within said channel confines during conveyance and wherein the tops of said crest-like members are continuously spaced a predetermined distance apart while in their normally biased condition, means disposed at said first and said second locations and operatively associated with said endless belt member for continuously urging said normally biased together crest-like members apart at said first and second locations thus providing access to said continuous channel whereby objects can be received into, or discharged from said channel, said means disposed at said first and second locations comprising at least one belt channel opening pulley at each said location, said belt channel opening pulley including a centrally disposed crown and a cone extending axially from each side of said crown, wherein said cones continuously engage the inner surfaces of said crest-like members to urge apart the normally biased together crest-like members of said endless belt member as said endless belt member travels past said first and second locations whereby said normally biased closed, channel is always open at said first and second locations, and motive means in communication with said means defining a conveyance path, for effecting the travel of said endless belt member about said conveyance path.

2. The belt conveyor apparatus according to claim 1 wherein the means defining the conveyance path include several idlers disposed between the first pulley and the second pulley.

3. The belt conveyor apparatus according to claim 2 wherein the conveyance path includes at least one directional change.

4. The belt conveyor apparatus according to claim 3 wherein the conveyance path includes at least one elevational change.

5. The belt conveyor apparatus according to claim 2 wherein the conveyance path includes at least one elevational change.

6. The belt conveyor apparatus according to claim 1 wherein the means disposed at the first location are operatively associated with the upper belt portion along the upper reach thereof.

7. The belt conveyor apparatus accoding to claim 6 wherein the means disposed at the second location are operably associated with the upper belt portion along the lower reach thereof.

8. The belt conveyor apparatus according to claim 1 including means for depositing the object into the endless belt channel at the first location and means for retrieving the object from said endless belt channel at the second location.

9. The belt conveyor apparatus according to claim 1 wherein the endless belt member includes a secondary channel longitudinally disposed below and in communication with the conveyance channel to facilitate access to said conveyance channel.

10. The belt conveyor apparatus according to claim 9 including a continuous lining material disposed in both the conveyance channel and the secondary channel.

11. The belt conveyor apparatus according to claim 1 including a continuous lining material disposed in the conveyance channel.

* * * * *